United States Patent [19]

Bowers

[11] Patent Number: 5,305,152

[45] Date of Patent: Apr. 19, 1994

[54] EVACUATED OPTICAL STRUCTURE COMPRISING OPTICAL BENCH MOUNTED TO SIDEWALL OF VACUUM CHAMBER IN A MANNER WHICH INHIBITS DEFLECTION AND ROTATION OF THE OPTICAL BENCH

[75] Inventor: Joel M. Bowers, Livermore, Calif.

[73] Assignee: The United States of America as represented by the United States Department of Energy, Washington, D.C.

[21] Appl. No.: 72,309

[22] Filed: Jun. 9, 1993

[51] Int. Cl.⁵ .............................................. G02B 27/00
[52] U.S. Cl. ................................. 359/896; 359/198; 359/819; 359/871
[58] Field of Search ............... 359/198, 199, 223, 224, 359/226, 230, 809, 810, 817, 819, 820, 871, 872, 876, 877, 878, 896; 141/59, 60, 43, 65, 66

[56] References Cited

U.S. PATENT DOCUMENTS

| | | | |
|---|---|---|---|
| 3,772,464 | 11/1973 | Chan et al. | 359/223 |
| 4,088,396 | 5/1978 | Edelstein | 359/822 |
| 4,147,401 | 4/1979 | Reichl et al. | 359/198 |
| 4,961,627 | 10/1990 | Swain et al. | 359/819 |
| 4,989,965 | 2/1991 | Bryan | 359/871 |
| 5,172,261 | 12/1992 | Kato et al. | 359/198 |
| 5,183,350 | 2/1993 | Kramer | 359/198 |
| 5,239,361 | 8/1993 | Burch | 359/876 |

Primary Examiner—Loha Ben
Attorney, Agent, or Firm—Miguel A. Valdes; Roger S. Gaither; William R. Moser

[57] ABSTRACT

An improved evacuated optical structure is disclosed comprising an optical bench mounted in a vacuum vessel in a manner which inhibits transmission of movement of the vacuum vessel to the optical bench, yet provides a compact and economical structure. The vacuum vessel is mounted, through a sidewall thereof, to a support wall at four symmetrically positioned and spaced apart areas, each of which comprises a symmetrically positioned group of mounting structures passing through the sidewall of the vacuum vessel. The optical bench is pivotally secured to the vacuum vessel by four symmetrically spaced apart bolts and spherical bearings, each of which is centrally positioned within one of the four symmetrically positioned groups of vacuum vessel mounting structures. Cover plates and o-ring seals are further provided to seal the vacuum vessel mounting structures from the interior of the vacuum vessel, and venting bores are provided to vent trapped gases in the bores used to secure the cover plates and o-rings to the vacuum vessel. Provision for detecting leaks in the mounting structures from the rear surface of the vacuum vessel sidewall facing the support wall are also provided. Deflection to the optical bench within the vacuum vessel is further minimized by tuning the structure for a resonant frequency of at least 100 Hertz.

20 Claims, 5 Drawing Sheets

5,305,152

EVACUATED OPTICAL STRUCTURE COMPRISING OPTICAL BENCH MOUNTED TO SIDEWALL OF VACUUM CHAMBER IN A MANNER WHICH INHIBITS DEFLECTION AND ROTATION OF THE OPTICAL BENCH

The invention described herein arose in the course of, or under, Contract No. W-7405-ENG48 between the United States Department of Energy and the University of California for the operation of the Lawrence Livermore National Laboratory.

BACKGROUND OF THE INVENTION

This invention relates to an evacuated optical structure. More particularly, this invention relates to the mounting of an optical bench in a vacuum chamber in a manner which will isolate the bench from deflections of the vacuum chamber.

An evacuated optical structure is frequently required for transporting high power laser light, because laser beam quality degrades as it passes through air. This is because small temperature variations in air can cause density variation, which tend to bend or distort the laser beam wave front. Therefore, laser beam transport structures typically are evacuated to pressures as low as $10^{-2}$ to $10^{-6}$ Torr to prevent these detrimental effects.

Laser systems also require lenses, mirrors, and other highly precise optical elements. Such optical components of the laser system are mounted to platforms, commonly called optical benches, to minimize motion. However, when the laser system, including such an optical bench, is required to be located within a vacuum vessel, the optical bench must be isolated from the distortions which a vacuum vessel experiences as it is being evacuated. Such motions are caused by the tremendous forces imposed by ambient atmospheric pressure on the boundary walls of the vessel as the air inside the vessel is being removed during pump down.

By isolating such an optical bench from such distortions of the vacuum vessel, is to permit alignment of the optical path, i.e., the optical system mirrors, lenses, etc., while the vessel is open and accessible, with no subsequent misalignment then occurring when the optics are enclosed in the vacuum system and less accessible for further adjustment.

One conventional design to achieve such isolation has been to provide an optical bench with legs which are independently mounted to a support outside of the vacuum vessel and then to provide bellows between the vacuum vessel and each leg so that any deflections of the vacuum vessel, e.g., during evacuation of the vacuum vessel, can be accommodated by the bellows without affecting alignment of the optical system mounted to the optical bench.

FIG. 1 shows such a prior art design wherein an optical bench 2 is provided with four leg assemblies (only one of which is shown), each comprising a bench plate portion 6, a pedestal portion 10, and a base portion 14 which is mounted to a support wall (not shown) external to a vacuum vessel 4 which is independently mounted to a support base. A threaded bolt 18 passes through a bore 12 in pedestal 10 and an enlarged counterbore 8 in bench plate portion 6 and is received in a tapped hole 16 in base portion 14 to thereby secure bench 2 to the support wall. Bellows 20 are mounted between vacuum vessel 4 and base portion 14 so that any movement of vacuum vessel 4, e.g., during evacuation, will be isolated from optical bench 2 by bellows 20.

While such a support and isolation design is adequate for the intended purpose of isolating movement of the vacuum vessel from the optical bench, the provision of such leg assemblies and bellows is both costly and massive. It would, therefore, be desirable if an optical bench could be mounted within a vacuum vessel, yet generally isolated from the movements of the vessel, to thereby provide a more compact and economical structure.

SUMMARY OF THE INVENTION

It is, therefore, an object of the invention to provide an improved evacuated optical structure comprising an optical bench mounted in a vacuum vessel in a manner which inhibits transmission of movement of the vacuum vessel to the optical bench, yet provides a compact and economical structure.

The vacuum vessel is mounted, through a sidewall thereof, to a support wall at four symmetrically positioned and spaced apart areas, each of which comprises a symmetrically positioned group of mounting means passing through the sidewall of the vacuum vessel. The optical bench is pivotally secured to the vacuum vessel by four symmetrically spaced apart fastening means, each of which is centrally positioned within one of the four symmetrically positioned groups of vacuum vessel mounting means. Sealing means are further provided to seal the vacuum vessel mounting means from the interior of the vacuum vessel, and venting means are provided to vent trapped gases in the bores used to secure the sealing means to the vacuum vessel. Leak detection means are further provided between the outer surface of the sidewall of the vacuum vessel and the support walls, at the mounting means, to detect leaks in the mounting means used to secure the vacuum vessel to the support wall. Deflection of the optical bench within the vacuum vessel is further minimized by tuning the structure for a resonant frequency of at least 100 Hertz. This is accomplished by selecting an optimum minimum optical bench thickness; selecting an optimum minimum vacuum vessel sidewall thickness; positioning individual mounting structures in a mounting group in a symmetrical pattern on a circle of predetermined diameter; and positioning mounting groups symmetrical to one another and spaced apart a predetermined center to center distance.

DETAILED DESCRIPTION OF THE INVENTION

Figure 1:
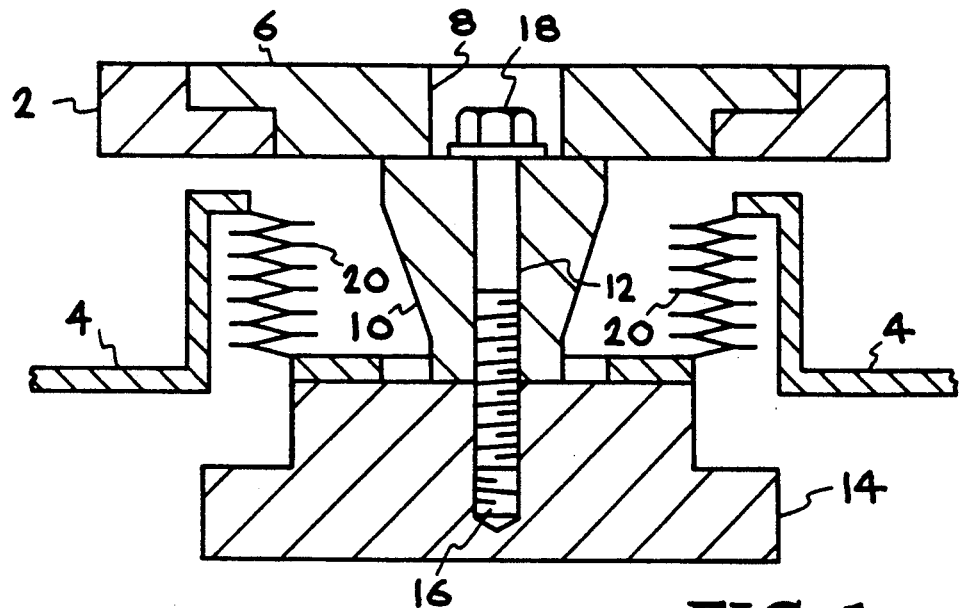
FIG. 1 is a fragmentary side section view of a prior art structure for mounting an optical system in a vacuum vessel in a manner which isolates the optical bench from movement of the vacuum vessel.
Figure 2:
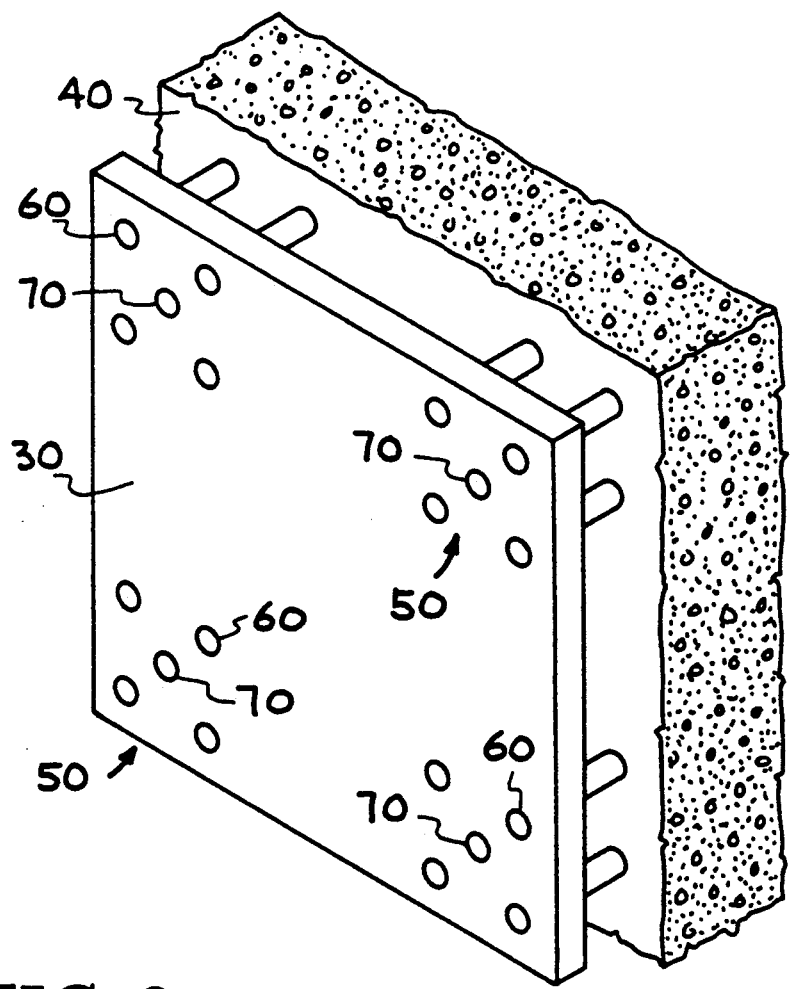
FIG. 2 is a perspective view of the positioning of mounting means on a vacuum vessel in accordance with the invention, to secure the vacuum vessel to a support wall, and fastening means used to mount an optical bench in the vacuum vessel.
Figure 3:
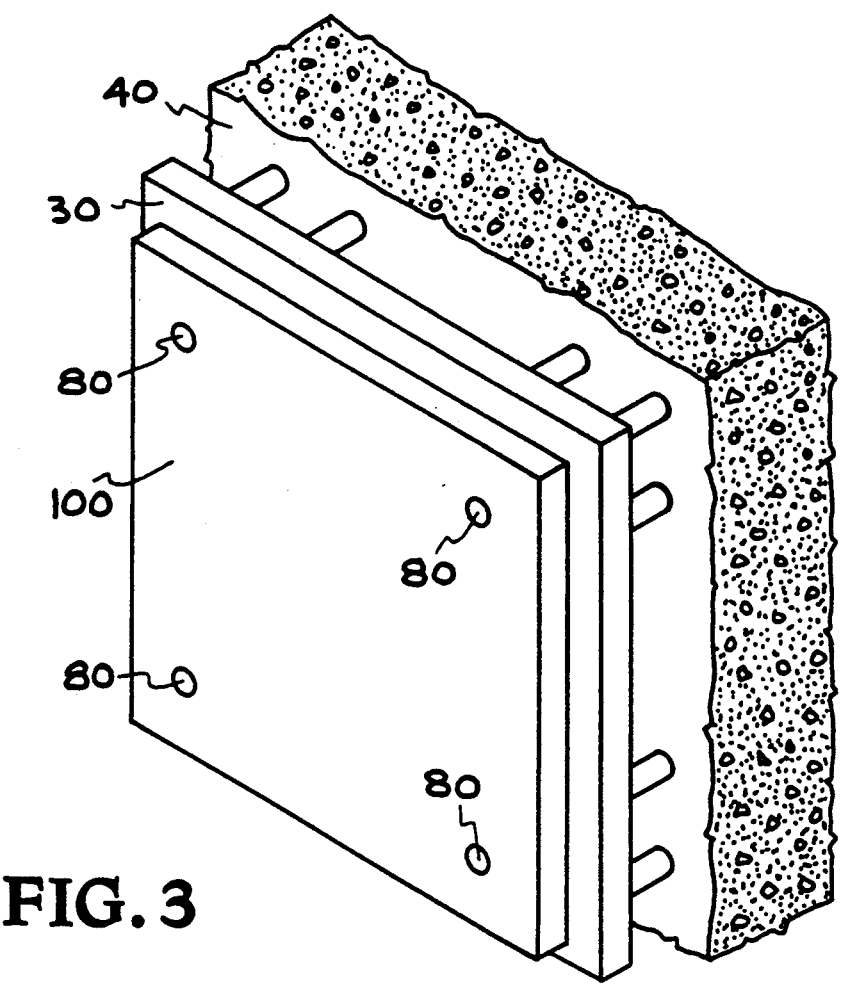
FIG. 3 is a perspective view of the optical bench fastened to the sidewall of the vacuum vessel in accordance with the invention.

Referring now to FIG. 2, four symmetrically arranged mounting groups for securing a sidewall 30, representing one wall of a vacuum vessel 24, to support wall 40 (behind sidewall 30) are each generally shown at 50, each of which mounting groups, in turn, comprises four symmetrically positioned, but otherwise identical mounting means 60. Centrally and symmetrically positioned within each mounting group 50 comprising mounting means 60 is a threaded bore 70 formed in sidewall 30 of vacuum vessel 24 used to secure an optical bench to sidewall 30. FIG. 3 shows such an optical bench 100 fastened to sidewall 30 via fastening means 80.

Figure 4:
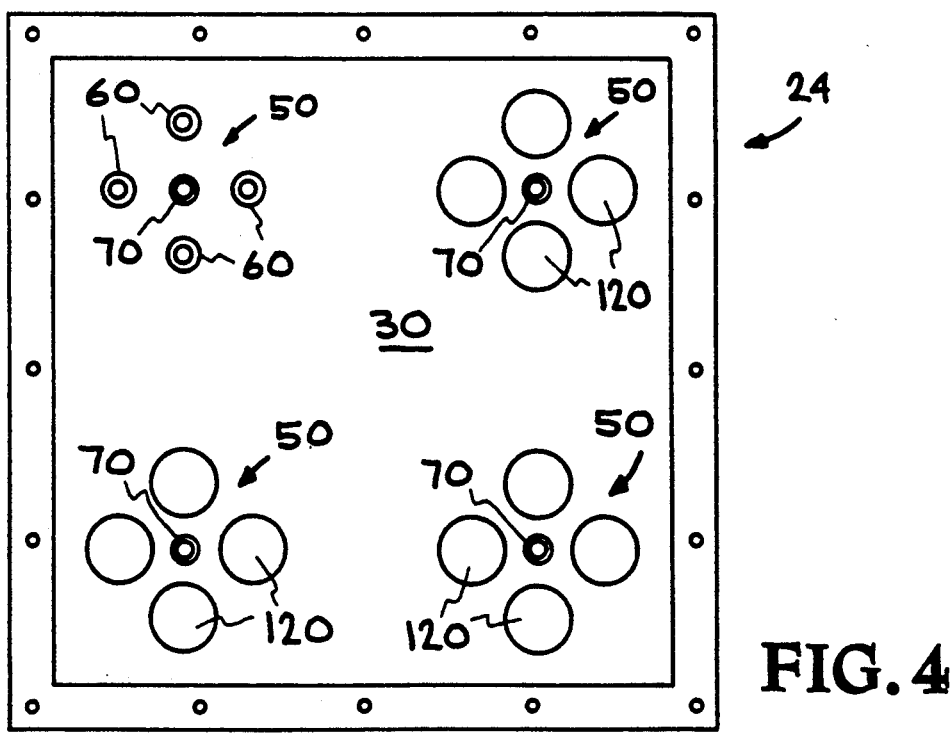
FIG. 4 is a side view showing the positioning of the fastening means for securing the optical bench to the vacuum vessel wall relative to the position of the mounting means for securing the vacuum vessel to a support wall.

FIG. 4, as well as FIG. 2, shows the symmetrical location of the four mounting groups 50 comprising mounting means 60 for securing sidewall 30 of vacuum vessel 24 to support wall 40 (not shown in FIG. 4), as well as the central and symmetrical location of each fastening means 80 for securing optical bench 100 to sidewall 30 of vacuum vessel 24. FIG. 4 further illustrates the provision of independent sealing means 120 located over each mounting means 60 to prevent ingress of gases through the openings in sidewall 30 of vacuum vessel 24.

The positioning of individual mounting means 60 in a symmetrical mounting groups 50 creates "hard spots" in sidewall 30 adjacent the centers of mounting groups 50 where deflection of sidewall 30 will be minimized. By placing bores 70 in sidewall 30 and fastening means 80 in the center of these "hard spots", deflection of optical bench 100 will, in turn, be minimized.

Figure 5:
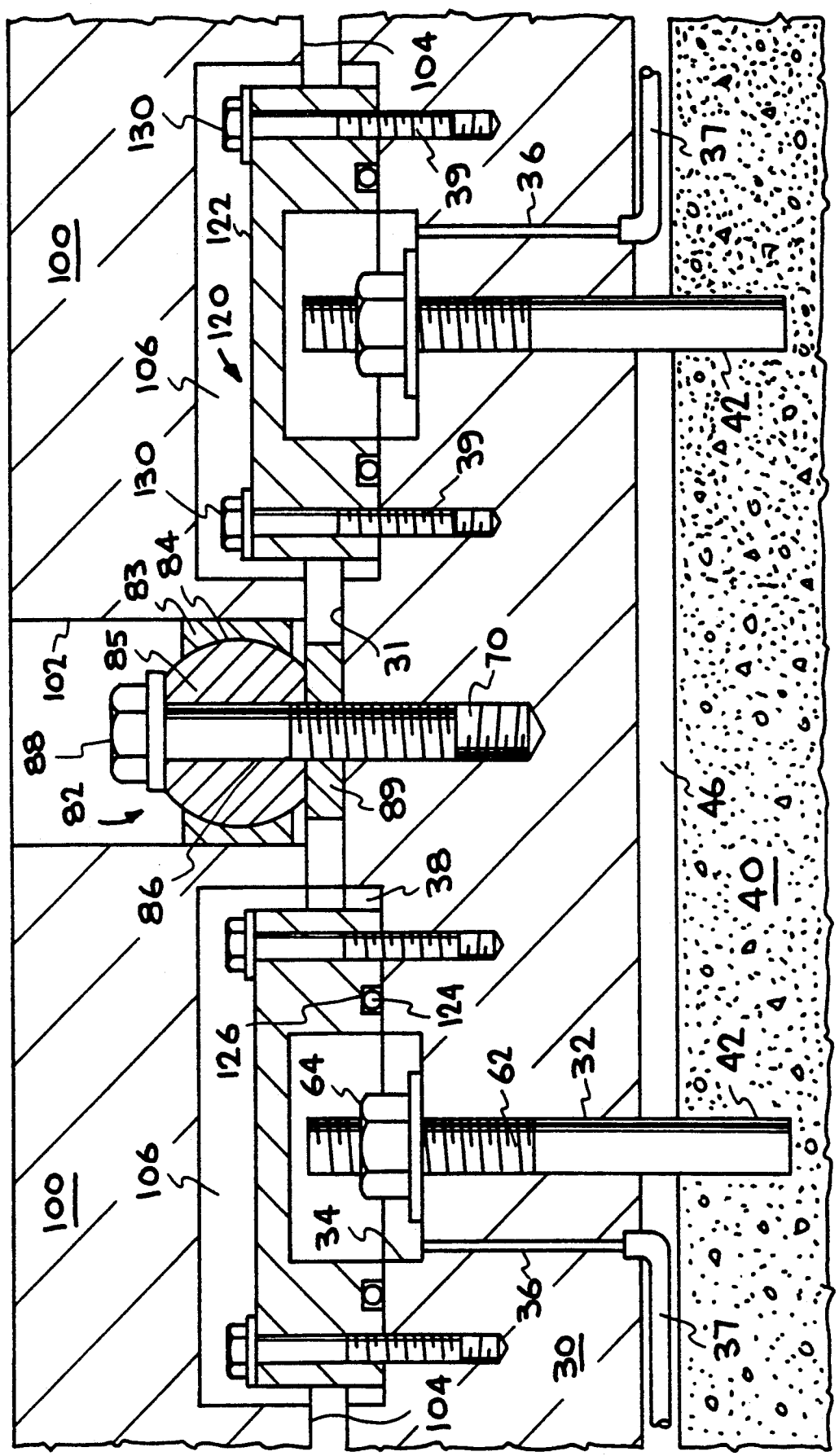
FIG. 5 is a fragmentary side section view of a portion of the optical bench and vacuum vessel showing, respectively, the mounting means used to secure the vacuum vessel to a support wall and the fastening means used to secure the optical bench to the vacuum vessel.
Figure 6:
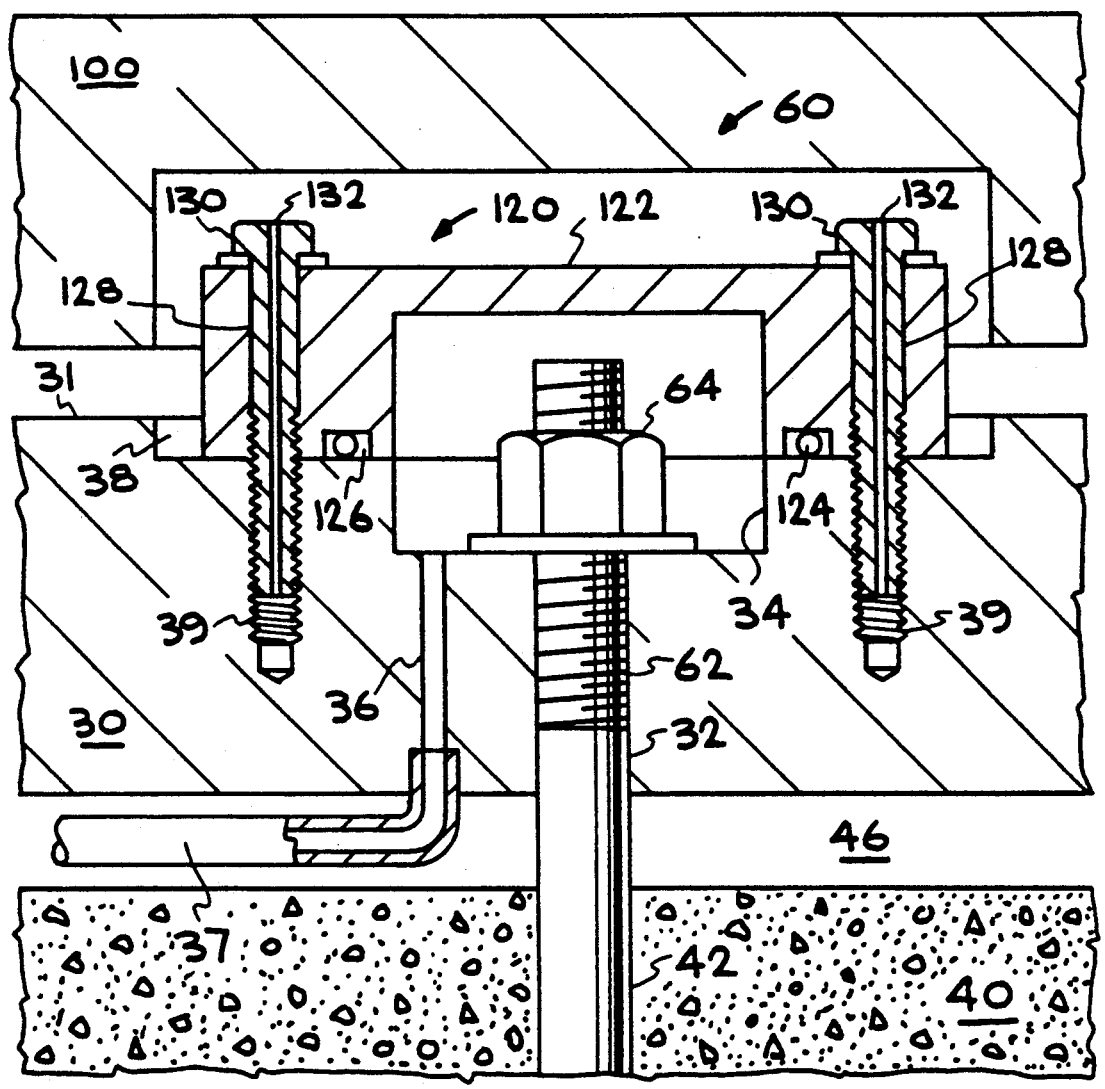
FIG. 6 is a fragmentary side section view of a portion of FIG. 5, showing in greater detail the mounting means for securing the vacuum vessel to a support wall.

Turning now to FIGS. 5–8, mounting means 60 for securing sidewall 30 of vacuum vessel 24 to a support wall 40 are shown in detail. As seen in FIGS. 5 and 6, sidewall 30 is provided with a bore 32 and an enlarged counterbore 34. A corresponding bore 42 in support wall 40 is threaded to receive a threaded bolt 62 having a bolt head 64. Alternatively a shaft having a threaded upper end could be driven into support wall 40 and a nut used in lieu of bolt head 64. During the initial mounting of sidewall 30 to support wall 40, temporary steel wedges (not shown) may be inserted between sidewall 30 and support wall 40 to space the two surfaces apart until leak testing has been carried out, as will be described below, and the space has been filled with a concrete grout material.

Figure 7:
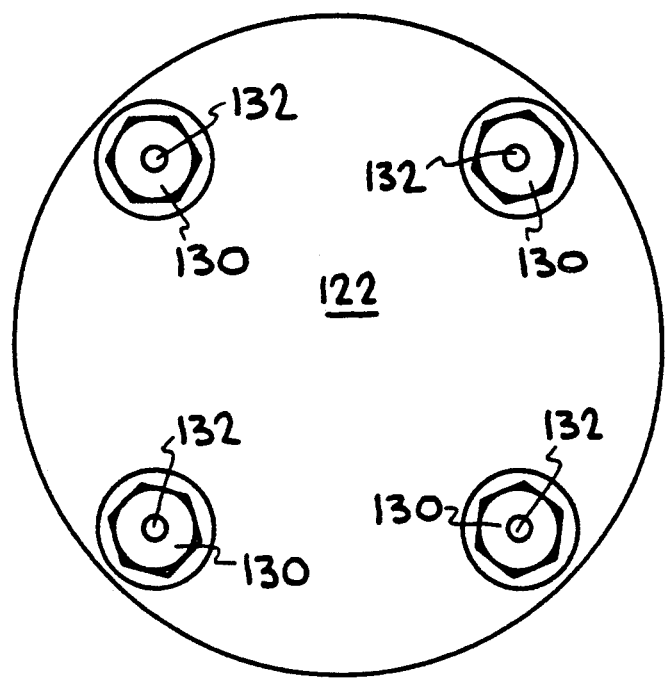
FIG. 7 is a top view of a plate used to cover and seal off the mounting means used to secure the vacuum vessel to a support wall.
Figure 8:
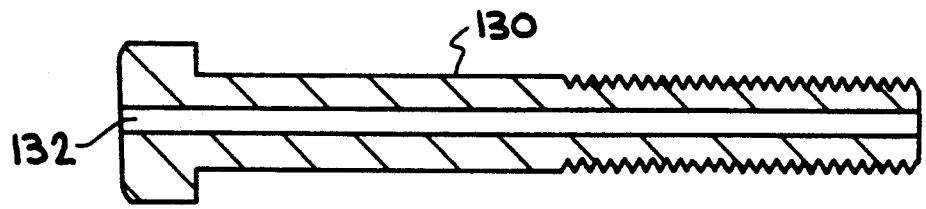
FIG. 8 is a side section view of the vented bolt used to secure the cover plate to the inner surface of the sidewall of the vacuum vessel.

Counterbore 34 is sized to be somewhat larger than bolt head 64 to permit bolt head 64 to be received in counterbore 34 and gripped by a socket wrench to rotate it in counterbore 34. Also communicating with counterbore 34 is a venting bore 36 which is used to detect any leaks in the sealing means used to seal mounting means 60 from the interior of vacuum vessel 24, as will be explained below. Coaxially positioned in side wall 30 of vacuum vessel 24 is a further counterbore or indent 38 to at least partially recess sealing means 120 which comprises a cover member 122, as shown in FIG. 7, and an o-ring seal 124 partially located in an annular groove 126 formed on the underside of cover member 122. Surrounding o-ring 124 are four openings 128 in cover member 122 which each receive vented bolt means 130, each having a central venting bore 132 therein, as best seen in FIG. 8. Mating threaded bores 39 are provided in indent portion 38 of sidewall 30 to receive vented bolt means 130.

After each threaded bolt means 62 has been placed in each of the sixteen shown bores 32 and rotated to secure sidewall 30 of vacuum vessel 24 to support wall 40, cover members 122, with o-rings 124 mounted therein, are placed in each indent 38 and then sealingly secured to sidewall 30 using vented bolts 130. The interior of vacuum vessel 24, e.g., inner surface 31 of sidewall 30, is then sealed off from each mounting means 60. Furthermore, the provision of central bore 132 in vented bolt means 130 will permit release or venting of any gases which otherwise might be trapped in bores 39 in sidewall 30 of vacuum vessel 24.

As mentioned above, venting bores 36 are provided which each communicate with the respective counterbores 34 and bores 32 of mounting means 60. Venting bores 36 are each, in turn, connected to a tube 37 which fits in the space 46 between sidewall 30 and support wall 40 and then comes around the end of sidewall 30 of vacuum vessel 24 to permit access to tube 37. The purpose of venting bores 36 and tubes 37 is to provide a source of a helium tracer gas to determine whether or not the corresponding o-ring 124 is providing an adequate seal between the interior of vacuum vessel 24, e.g., between inner surface 31 of sidewall 30, and bores 32 and 34, representing the exterior of vacuum vessel 24. While the helium tracer gas flows sequentially through each tube 37 and corresponding bore 36, the interior of vacuum vessel 24 is evacuated through a helium leak detector. If helium is detected, indicative of a faulty o-ring seal, the helium leak detector sounds an alarm. Since sidewall 30 of vacuum vessel 24 is mounted in very close proximity there is no way to monitor for leaks, or at least to determine which o-ring seal 124 is leaking without the provision of venting bores 36 and tubes 37.

It should be further noted that once vacuum vessel 24 has been mounted to support wall 40 and the o-ring seals 124 have been helium leak tested, using vent bores 36 and tubes 37, the space 46 between sidewall 30 of vacuum vessel 24 and support wall 40 may be filled with a concrete grout compound and the temporary steel wedge spacers may be removed. It should be noted that this space between sidewall 30 and support wall 40 is further provided to provide room to align vessel 24, since support wall 40 is not always perfectly flat.

The securement of sidewall 30 of vacuum vessel 24 to a support wall 40, such as a concrete wall, thus provides a section of vacuum vessel 24 (represented by illustrated sidewall 30) in which deflection of vacuum vessel 24 during evacuation will be minimized. Furthermore, by sizing the thickness of sidewall 30, the spacing apart of the four symmetrically positioned mounting groups 50, the spacing apart of each mounting means 60 within each mounting group 50, and the central location of the fastening means 80 for mounting optical bench 100 to sidewall 30 within each mounting group 50, the resulting structure may be tuned to provide a resonant frequency above the noise frequencies normally encountered. Most structural noise frequencies are below 100 Hertz, while the design of a structure which will resonate at a frequency significantly above 100 Hertz increases the cost.

Therefore, the structure is optimally designed to provide a resonant frequency of about 100 Hertz. This can be accomplished, in a preferred embodiment, by a combination of providing a wall thickness of sidewall 30 of at least about 2 inches; providing a wall thickness of at least about 2 inches for optical bench 100; providing a spacing of from about 26 to about 30 inches, most preferably about 28 inches, center to center between the fastening means 80 for mounting optical bench 100 to sidewall 30 (i.e., a spacing between the centers of the respective groups 50); and positioning mounting means 60 in each mounting group 50 symmetrically on a 7 to 9 inch, preferably about 8 inch, diameter circle coaxial around central bores 70 and optical bench fastening means 80 secured thereto.

Figure 9:
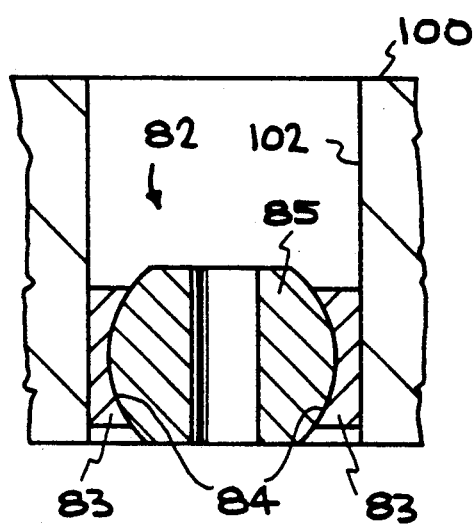
FIG. 9 is a fragmentary side section view of a portion of FIG. 5 showing in greater detail the spherical bearing mounted in a bore in the optical bench to receive a bolt used to fasten the optical bench to the wall of the vacuum vessel.
Figure 10:
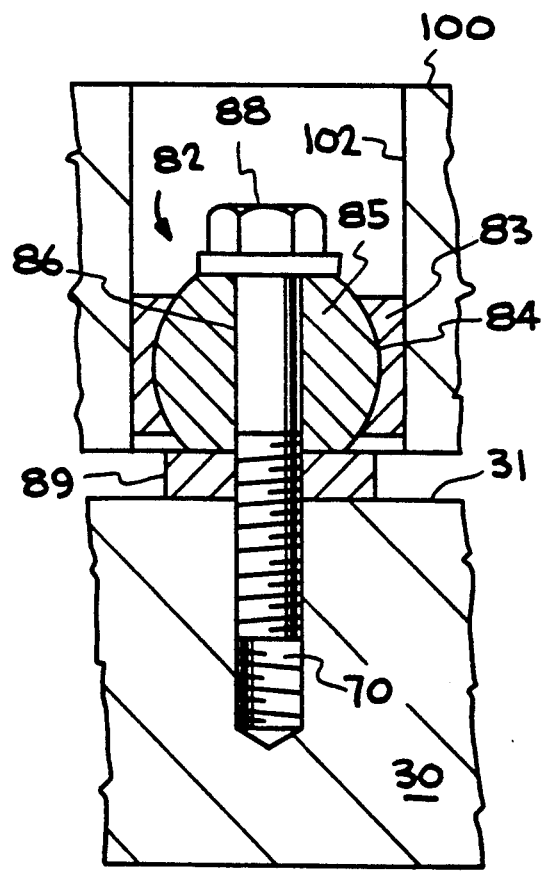
FIG. 10 is a fragmentary side section view of a portion of FIG. 5 showing in greater detail the fastening of the optical bench to the sidewall of the vacuum vessel using the spherical bearing depicted in FIGS. 5 and 9.

Referring now to FIGS. 3-5, 9, and 10, the securement of optical bench 100 to sidewall 30 will now be described. As shown in FIGS. 3 and 4, the four fastening means 80 are symmetrically spaced apart to define a square, with an optimal spacing apart of adjacent fastening means 80 of about 28 inches. Each fastening means 80, as seen in FIGS. 5, 9, and 10, comprises a bore 102 which passes completely through optical bench 100. Each bore 102 in optical bench 100 is generally in registry with corresponding bore 70 in sidewall 30 of vacuum vessel 24. As previously mentioned, each bore 70 is centrally positioned within a mounting group 50 with mounting means 60 in that group symmetrically spaced around bore 70.

Into each bore 102 is press fit a spherical bearing member 82 comprising a rigid sleeve 83 having a spherical socket portion 84, and a spherically shaped rotatable ball 85 which fits into socket 84. Rotatable ball 85 is provided with a central bore 86. A threaded bolt 88 is positioned in bore 86 and is threadedly received in corresponding threaded bore 70 in sidewall 30. Since each threaded bore 70, as previously described, is centrally positioned within each mounting group 50 of mounting means 60 on sidewall 30, the securement of optical bench 100 to sidewall 30 via bores 70 and fastening means 80 is symmetrical with respect to the securement of sidewall 30 to support wall 40 via mounting means 60.

As shown in FIGS. 5 and 10, spacer means 89 is provided to space optical bench 100 a predetermined distance from sidewall 30. Spacer 89 insures that the only contact between bench 100 and sidewall 30 is through spherical bearing 82. It will be also noted that the rear surface 104 of optical bench 100 is provided with bores or recesses 106 in registry with each cover 122 of sealing means 120 so that the desired spacing of optical bench 100 from sidewall 30 of vacuum vessel 24 will not be interfered with by cover 122. That is, the thickness of spacer means 89 will not be influenced by the thickness of cover 122, since recess 106 is large enough and deep enough to accommodate cover 122 independent of the spacing between optical bench 100 and sidewall 30.

The provision of socket bearing member 82 is to provide a pivotal mounting between optical bench 100 and sidewall 30 to compensate for any possible symmetrical misalignment of the respective positions of bolts 88 and bores 102 in optical bench 100, and bores 70 in sidewall 30, relative to corresponding mounting means 60 on sidewall 30. Rotation of the surface of optical bench 100 is thereby minimized by the mounting of bench 100 on spherical bearing members 82 which are, in turn, mounted at "hard spots" on sidewall 30 of vacuum vessel 24. Each spherical mount then behaves as a pinned joint and any rotations in sidewall 30 of vacuum vessel 24 are not transferred to optical bench 100. The resulting minimization of bench surface rotations is of even greater importance to optical structures then translations.

Thus, the invention provides an improved evacuated optical structure wherein an optical bench is mounted within a vacuum vessel by symmetrically securing it to a sidewall of the vacuum vessel which is, in turn, mounted to a support wall by symmetrically spaced apart mounting groups, each of which comprise a plurality of mounting means which symmetrically surround each of the fastening means for securing the optical bench to the sidewall of the vacuum vessel. The resulting structure minimizes any transfer of movement or distortion from the vacuum vessel to the optical bench, while providing a compact and economical mounting structure.

While a specific embodiment of the evacuated optical structure has been illustrated and described for mounting an optical bench within a vacuum vessel in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. An evacuated optical structure comprising:
   a) a vacuum vessel having a sidewall thereon;
   b) a plurality of symmetrically spaced apart groups of mounting means to mount said vacuum vessel to a support wall, each of said groups of mounting means comprising a plurality of mounting means symmetrically positioned around a central bore in said sidewall;
   c) an optical bench; and
   d) a plurality of fastening means attached to said optical bench at symmetrically spaced apart points, each of said fastening means having a portion received in one of said central bores;

whereby said optical bench is symmetrically mounted to said sidewall of said vacuum vessel at points where said vacuum vessel is most securely mounted to said support wall to thereby minimize any deflection of said optical bench within said vacuum vessel.

2. The evacuated optical structure of claim 1 wherein said plurality of mounting means in each of said mounting groups comprise four mounting means symmetrically positioned around said central bore.

3. The evacuated optical structure of claim 2 wherein said plurality of mounting means in each of said mounting groups are positioned around said central bore along the circumference of a circle having a diameter of from about 7 to about 9 inches.

4. The evacuated optical structure of claim 2 wherein said plurality of mounting means in each of said mounting groups are positioned around said central bore along the circumference of a circle having a diameter of from about 8 inches.

5. The evacuated optical structure of claim 2 wherein said plurality of mounting groups of mounting means comprise four mounting groups of said mounting means.

6. The evacuated optical structure of claim 5 wherein the center of each of said symmetrically spaced apart mounting groups of mounting means is spaced a distance of from about 26 to about 30 inches from the center of an adjacent mounting group.

7. The evacuated optical structure of claim 5 wherein the center of each of said symmetrically spaced apart mounting groups of mounting means is spaced a distance of about 28 inches from the center of an adjacent mounting group.

8. The evacuated optical structure of claim 1 wherein the thickness of said sidewall of said vacuum vessel, in the area wherein said mounting groups of mounting means secure said sidewall to said support wall, is at least about 2 inches.

9. The evacuated optical structure of claim 1 wherein the wall thickness of said optical bench is at least about 2 inches.

10. The evacuated optical structure of claim 1 wherein each of said fastening means further comprises means for pivotally mounting said optical bench to said sidewall of said vacuum vessel, whereby rotation of said optical bench will be minimized.

11. The evacuated optical structure of claim 10 wherein said means for pivotally mounting said optical bench to said sidewall of said vacuum vessel further comprises spherical bearing means, each mounted in a bore in said optical bench generally in registry with one of said central bores in said sidewall of said vacuum vessel.

12. The evacuated optical structure of claim 1 which further comprises means for individually sealing each of said mounting means.

13. The evacuated optical structure of claim 12 wherein said means for individually sealing each of said mounting means further comprise:
 a) cover means secured to an inner surface of said sidewall over each of said mounting means; and
 b) an o-ring seal surrounding said mounting means and mounted between said inner surface of said sidewall and the undersurface of said cover means to seal said mounting means from the remainder of said vacuum vessel.

14. The evacuated optical structure of claim 13 wherein said means for individually sealing said mounting means further includes a plurality of vented securement means for securing said cover means to said inner surface of said sidewall in a manner which will not trap gases in said securement means.

15. The evacuated optical structure of claim 14 wherein each of said vented securement means comprises a bolt with a central venting bore therein.

16. The evacuated optical structure of claim 13 wherein said cover means and said o-ring seal are at least partially recessed into said inner surface of said vacuum vessel sidewall.

17. The evacuated optical structure of claim 1 wherein venting bore means are provided to communicate between bores in said sidewall containing said mounting means and a rear surface of said sidewall facing said support wall; and tube means, extending beyond an end edge of said sidewall, communicate with said venting bore means; whereby access is provided to said rear surface to facilitate testing said mounting means for leaks to said rear surface of said sidewall.

18. An evacuated optical structure comprising:
 a) a vacuum vessel having a sidewall thereon;
 b) four symmetrically spaced apart groups of mounting means extending through said sidewall to mount said vacuum vessel to a support wall, each of said groups of mounting means comprising at least four mounting means symmetrically positioned around a central bore in said sidewall;
 c) means for individually sealing each of said mounting means comprising:
  i) cover means secured to an inner surface of said sidewall over each of said mounting means; and
  ii) an o-ring seal surrounding said mounting means and mounted between said inner surface of said sidewall and the undersurface of said cover means to seal said mounting means from the remainder of said vacuum vessel;
 d) means for detecting leaks in said mounting means from a rear surface of said sidewall comprising:
  i) venting bore means to communicate between said mounting means in said sidewall and said rear surface of said sidewall facing said support wall; and
  ii) tube means, extending beyond an end edge of said sidewall, and in communication with said venting bore means;
 whereby access is provided to said rear surface to facilitate testing said mounting means for leaks to said rear surface of said sidewall;
 e) an optical bench; and
 f) four fastening means pivotally attached to said optical bench at symmetrically spaced apart points, each of said fastening means having a portion received in one of said central bores;
whereby said optical bench is symmetrically mounted to said sidewall of said vacuum vessel at points where said vacuum vessel is most securely mounted to said support wall to thereby minimize any deflection of said optical bench within said vacuum vessel.

19. The evacuated optical structure of claim 18 wherein said structure is tuned to have a resonant frequency of at least 100 Hertz by:
 a) positioning said at least four mounting means in each of said mounting groups around said central bore along the circumference of a circle having a diameter of from about 7 to about 9 inches;
 b) spacing the center of each of said four symmetrically spaced apart mounting groups of mounting means a distance of from about 26 to about 30 inches from the center of an adjacent mounting group;
 c) providing a vacuum vessel sidewall thickness of at least about 2 inches; and
 d) providing an optical bench thickness of at least about 2 inches.

20. An evacuated optical structure comprising:
 a) a vacuum vessel having a sidewall thereon having a thickness of at least about 2 inches;

b) four groups of mounting means extending through said sidewall to mount said vacuum vessel to a support wall, each of said mounting groups symmetrically spaced apart from one another a distance of from about 27 to about 29 inches, each of said groups of mounting means comprising four mounting means symmetrically positioned in a circle around a threaded central bore in said sidewall, said circle having a diameter of from about 7 to about 9 inches;

c) means for individually sealing each of said mounting means comprising:
  i) cover means secured to an inner surface of said sidewall over each of said mounting means;
  ii) an o-ring seal surrounding said mounting means and mounted between said inner surface of said sidewall and the undersurface of said cover means to seal said mounting means from the remainder of said vacuum vessel; and
  iii) vented securement means comprising a bolt with a central venting bore therein for securing said cover means to said inner surface of said sidewall whereby gases will not be trapped in said securement means;

d) means for detecting leaks in said mounting means from a rear surface of said sidewall comprising:
  i) venting bore means to communicate between said mounting means in said sidewall and said rear surface of said sidewall facing said support wall; and
  ii) tube means, extending beyond an end edge of said sidewall, and in communication with said venting bore means;
  whereby access is provided to said rear surface to facilitate testing said mounting means for leaks to said rear surface of said sidewall;

e) an optical bench having a minimum thickness of about 2 inches; and f) four fastening means pivotally attached to said optical bench at symmetrically spaced apart points, each of said fastening means further comprising:
  i) spherical bearing means received in a bore in said optical bench; and
  ii) threaded shaft means passing through said spherical bearing means and received in one of said threaded central bores;

whereby said optical bench is symmetrically mounted to said sidewall of said vacuum vessel in a manner which will minimize any deflection or rotation of said optical bench within said vacuum vessel.

* * * * *